Dec. 6, 1938.　　　　N. SCHWARTZ　　　　2,139,137
FILTER TYPE RESPIRATOR
Filed July 16, 1937
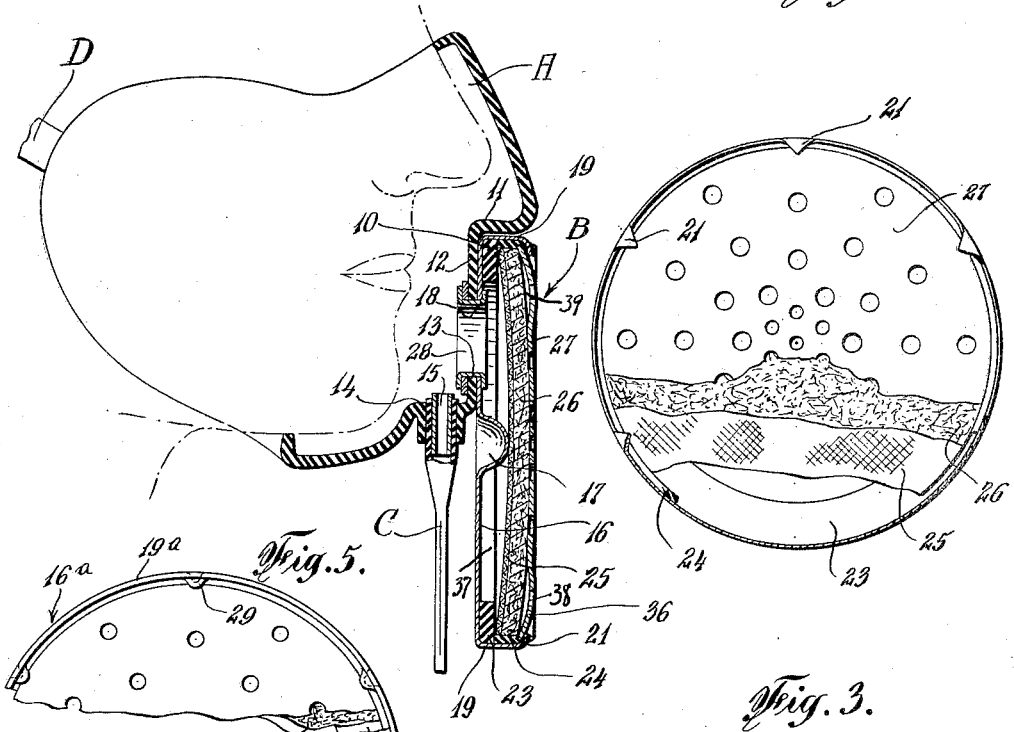
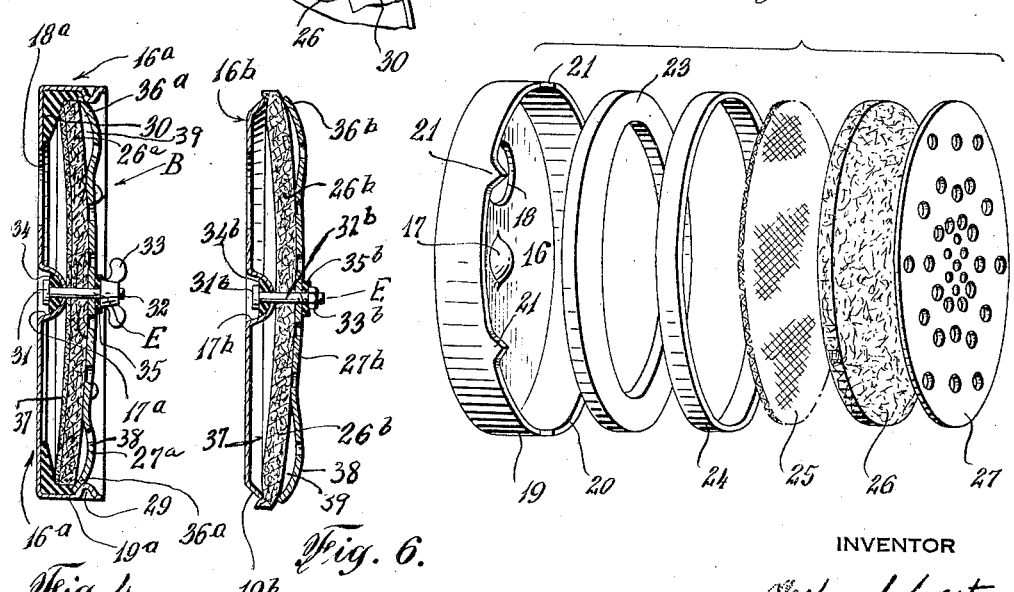
INVENTOR
Nathan Schwartz Patented Dec. 6, 1938

2,139,137

UNITED STATES PATENT OFFICE 2,139,137

FILTER TYPE RESPIRATOR

Nathan Schwartz, New York, N. Y.

Application July 16, 1937, Serial No. 153,885

3 Claims. (Cl. 128—146)

This invention relates to filter type respirators adapted to cover the nose and mouth of the wearer for the purpose of protection against dust, fumes, and noxious gases, and is a modification of my copending application, filed July 2, 1937, Serial No. 151,629.

The object of this invention is to provide a simplified filter unit construction wherein the loss of filtration area of the filter material is minimized and where the parts of the said unit are easily replaceable.

Another object is to facilitate the cleaning of the filter unit.

Another object is to provide a large filtration area with a small air space between the filter material and its supporting wall.

Another object is to provide a leak proof joint at the inlet port of the filter unit without utilizing a large area of the marginal portion of the filter material for impingement thereon by a clamping element. Such clamping elements, which may be flanges, grooves, extension-caps or screw caps, by their impingement upon the said marginal portion of the filter material, actually cause a reduction in the filtration area of the said material. In the new device herein described and shown, such clamping elements are eliminated. The importance of this feature will be more fully explained further on.

Another object is to provide a centrally located bolt clamping arrangement for firmly securing the filter material in its mounted position.

With these and other objects in view, the invention consists of certain novel features of construction as hereinafter shown and described and then specifically pointed out in the claims.

In the drawing:

Figure 1 is a cross section of the improved respirator on applied position.

Figure 2 is a front view of the filter unit or separator partly in section.

Figure 3 is an exploded perspective view of the separator.

Figure 4 is a modified form of the separator or filter unit in section.

Figure 5 is a perspective front view of the modified form, partly broken.

Figure 6 is a section of the filter unit in the third form of this invention.

Referring to the drawing by character of reference, A designates the face-piece of the respirator, B the filter unit or separator, C the exhaust valve, D the head-band, E the bolt.

The face-piece A is preferably of molded rubber and has a recess 10 below the nose line, which recess has a horizontal nose covering portion 11 and vertical mouth and chin covering portion 12. The vertical mouth and chin covering portion has an aperture 13. Another recess 14 located at about the chin line also has an aperture 15 wherein is inserted the exhaust valve C and adhesively attached thereat by means of rubber cement.

The filter unit or separator B has a casing 16, which has a central protrusion 17, an aperture 18 and flange 19. The flange has a marginal portion 20 and the said margin 20 is inturned at several places, preferably five such places, and thereby providing inward marginal protrusions or tines 21. The casing 16 also has an aperture 18. A washer 23, preferably of rubber, is provided at the marginal portion of the inner side of the casing wall, and another washer 24 is provided at the inner side of the flange 19. A wire-mesh 25 is placed to the inner side of the washer 23, and the protrusion 17 and filter material 26 are placed in confronting relation to the said wire-mesh. A foraminous supporting element 27 is placed in confronting relation to the said filter material. The flange 19 is resilient and therefore the wire-mesh, filter material and supporting element are emplaced and positioned as described, flange 19 with its washer lining 24 compressingly engages the said elements, with the tines 21 impinging on the said supporting element 27 to form a leak proof joint thereat. Due to the resiliency of the flange 19 the said filter elements are removable; i. e. the flange 19 yields to outward pressure and its circumferential area is thereby enlarged. The fingers of the handy man are sufficient, or a blunt instrument may be used, to cause the said diametric enlargement. Pressure is applied against the filter elements from the aperture area, and the said elements are thus removed or displaced.

The aperture 22 of the casing is connected with the aperture 13 of the face-piece of the respirator by means of an eyelet 28, and communication is thus established between the said face-piece and the said separator.

The second form of this invention is illustrated in Figures 4 and 5 and is designed for more effective filtration, i. e. heavier duty work. The filter elements are more firmly clamped to the casing.

The separator or filter unit B has a casing 16a which has a central protrusion 17a and an aperture 18a, also a flange 19a. The flange 19a has about 5 indents or inward protrusions 29. The periphery of the casing at its inner side has an angular washer 30 which washer lines the marginal portion of the casing and the flange 19a. The wire mesh 25a abuts the protrusion 17a and also the washer 30. The filter material 26a is confrontingly in covering relation to the said wire-mesh, and the foraminous supporting element 27a is confrontingly in covering relation to the filter material. The flange 19a is resilient, therefore, when the filter elements are inserted its diameter is caused to be enlarged to permit the emplacement of a comparatively stiff supporting element 27a. That is, to permit its passage past the inward protrusions 29. The said protrusions 29 impinge upon the filter elements and thereby provide a leak-proof joint at the marginal portion of the filter unit. For further security in this form of the invention a bolt E is provided at the central portion of the casing, namely, at the protrusion 17a. The said bolt has a head 31, a threaded shaft 32, and a thumb screw nut 33. Also rubber washers are provided, one between the head of the bolt and the protrusion and one between the thumb screw and the foraminous supporting element. These are numbered in the drawings 34 and 35 respectively. The purpose of the bolt is to cause a firmer hold on the filter elements, and is meant for heavy duty work, where activity is a large factor in the working conditions and requirements.

It is to be understood that in the second form of this invention the filter unit or separator has a bolt and nut arrangement for mounting the filter elements. The bolt and nut arrangement may be sufficient to firmly secure the said elements at their mountings. However, an additional securing means is provided by having the flange 19a supplied with indents or inward protrusions 29. It is apparent that if the supporting element 27a be sufficiently firm and stiff it will impinge the filter material and the washer against the flange and the marginal portion of the casing 16a and thereby form a leak-proof joint. Therefore the indents 29 are merely additional security for firmness at the said juncture.

It is also to be understood that the indents 29 may be sufficient for securing the filter elements at their mountings without the bolt and nut arrangement.

It is clear therefore from the drawing and the description that only very little of the marginal portion of the filter material is actually clamped or impinged upon. That is, in the improved arrangement the foraminous supporting element 27 has a rearward curve 36 at its marginal portion. The said curve causes the edges of the said supporting element to engage the filter material at its outer edges and to impinge the said outer edges against the washer and its outer flange support. Therefore, only the external edges of the filter material are impinged upon; whereas, in the older methods about one quarter of an inch of filter material edge was impinged upon, thereby loosing to filtration about 0.8 of a square inch of filtering material. This figure was arrived at when the given filter material was disc shaped and 4⅛ inches in diameter.

It is to be noted that good filter material is expensive and waste is to be eliminated. Furthermore, breathing is easier when the filtration surface area is larger. In the second form of this invention a flange and a washer lining for the said flange is shown and described, but it is apparent that even without the said flanged arrangement the filter supporting element 27a may impinge the filter material edges against the plate edges, or against its washer lining, in a manner to provide a leak proof joint thereat. This arrangement takes up less space and permits the use of a larger filter material, and it is also less costly.

The aforementioned simplification of this invention is illustrated in Figure 6 of the drawing, and it is herein designated as the third form of the invention. The filter unit or separator is very much like in the second form. But the marginal portion of the casing 16b is arranged in a more simplified manner. The flange 19b is preferably but not necessarily at a 45 degree angle with relation to its base. The advantage here is that the air space 37 is extended to the very edge of the filter unit, and therefore very useful where a large filter area is necessary for easy breathing. The foraminous supporting element 27b is in covering relation to the filter material 26b and its margin is curved rearward 36b to impinge on the edges of the filter material compressing same against the flange edges 19b, thereby producing a leak proof joint thereat. The bolt E is emplaced centrally. It has a head 31b, a threaded shaft 32b, a screw cap 33b, a rear washer 34b, and an interior washer 35b. Note that the supporting elements 27, 27a and 27b have circumferential forward curves 38, whereby an air space 39 is produced circumferentially at the outer marginal portion of the filter material. This arrangement is a further aid in enlarging the marginal filter area.

Having thus described my invention I claim as new and desire to secure by Letters Patent as follows:

1. A respirator, a face-piece having a body portion with an inlet port, a filter unit including a plate with an aperture and a marginal flange, filter material, foraminous supporting element for the said material, and means for mounting the said material and its supporting element in the said unit comprising an annular washer disposed at the inner peripheral portion of the said plate, with the said flange having a plurality of inward protrusions and the said material disposed in covering relation to the inner side of the said element, with the material and the element mounted at the said flange with the element impinging the edges of the material against the angular washer, the said protrusions clamping the element and securing its edges at the said marginal engagement, insuring a leak proof joint thereat, and a threaded bolt disposed centrally, engaging the said plate, material and element with a threaded nut at one end of the said bolt, threaded thereat to clamp together the central portions of the said plate, material and element, and the said inlet port is connected with the said aperture establishing communication therebetween.

2. A filter unit for filter type respirators, including a plate having a marginal flange with a plurality of inward protrusions filter material and a supporting element for the said material, the said material being mounted at the said marginal flange by having the edges of the said supporting element impinging upon the edges of the said material and having the said protrusions arranged to clamp the said element and material against the marginal portion of the plate.

3. A filter unit for filter type respirators having an inlet port with filter means comprising a plate, filter material and a foraminous supporting element for the said material, the said material being mounted in confronting relation to the said plate and spaced therefrom and the said element being mounted in covering relation to the said material with its edges curved toward the said material, and the said element has means to clamp it against the said material and the said plate, whereby the edges of the said element impinge upon the edges of the said material and thereby providing a leak proof joint thereat.

NATHAN SCHWARTZ.